United States Patent
Shi et al.

(10) Patent No.: US 9,591,614 B2
(45) Date of Patent: *Mar. 7, 2017

(54) APPARATUS AND METHODS FOR OPTIMIZING SCHEDULED OPERATIONS IN HYBRID NETWORK ENVIRONMENTS

(71) Applicant: Apple Inc., Cupertino, CA (US)

(72) Inventors: Jianxiong Shi, Pleasanton, CA (US); Madhusudan Chaudhary, Sunnyvale, CA (US); Li Su, San Jose, CA (US); Isabel Mahe, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,546

(22) Filed: Apr. 13, 2015

(65) Prior Publication Data
US 2015/0296483 A1 Oct. 15, 2015

Related U.S. Application Data (63) Continuation of application No. 13/475,655, filed on May 18, 2012, now Pat. No. 9,009,320.

(Continued)

(51) Int. Cl.
*H04W 68/02* (2009.01)
*H04W 72/12* (2009.01)
*H04W 92/04* (2009.01)

(52) U.S. Cl.
CPC ....... *H04W 68/02* (2013.01); *H04W 72/1215* (2013.01); *H04W 72/1226* (2013.01); *H04W 92/04* (2013.01)

(58) Field of Classification Search
None
See application file for complete search history.

(56) References Cited

U.S. PATENT DOCUMENTS 6,996,745 B1    2/2006  Shaylor
7,439,895 B1 *  10/2008 Widdowson .......... H03F 1/3223
                                              341/144

(Continued)

FOREIGN PATENT DOCUMENTS

EP    415515 A2    3/1991
EP   0415515 A2    3/1991

(Continued)

OTHER PUBLICATIONS

Korean Patent Application No. 10-2013-0733956—Office Action dated Jan. 16, 2015.

(Continued)

*Primary Examiner* — Ninos Donabed
(74) *Attorney, Agent, or Firm* — Downey Brand LLP (57) ABSTRACT

Methods and apparatus for intelligent scheduling of client device tasks based on one or more network scheduling constraints. During normal network operation, a client device performs an array of scheduled maintenance tasks to optimize network performance (e.g., signal strength measurements, etc.) However, during hybrid network operation, regularly scheduled maintenance tasks for a first network can interrupt higher priority tasks on other networks. Consequently, the present invention in one embodiment provides a method for a client device to properly prioritize and re-schedule maintenance tasks. For example, CDMA 1X cell selection (or cell re-selection) procedures have flexible time constraints, and can be postponed (or expedited) to minimize impact on LTE network traffic.

20 Claims, 4 Drawing Sheets

Related U.S. Application Data (60) Provisional application No. 61/488,663, filed on May 20, 2011, provisional application No. 61/598,824, filed on Feb. 14, 2012, provisional application No. 61/599,325, filed on Feb. 15, 2012.

(56) References Cited

U.S. PATENT DOCUMENTS

| | | | |
|---|---|---|---|
| 7,772,933 B1 * | 8/2010 | Nicholls | H03B 5/1231 331/117 FE |
| 7,915,962 B2 | 3/2011 | Nicholls et al. | |
| 7,929,962 B2 | 4/2011 | Bachl et al. | |
| 8,134,992 B1 | 3/2012 | Nam et al. | |
| 8,270,972 B2 | 9/2012 | Otting et al. | |
| 8,326,341 B2 | 12/2012 | Hugi et al. | |
| 8,331,256 B2 | 12/2012 | Lee et al. | |
| 8,412,190 B1 | 4/2013 | Moisanen et al. | |
| 8,565,109 B1 | 10/2013 | Poovendran et al. | |
| 8,687,608 B2 | 4/2014 | Soliman | |
| 9,008,033 B2 | 4/2015 | Su et al. | |
| 2002/136184 A1 | 9/2002 | Liang et al. | |
| 2003/0181216 A1 | 9/2003 | Tsai et al. | |
| 2003/0214914 A1 | 11/2003 | Cain | |
| 2007/0149206 A1 | 6/2007 | Wang et al. | |
| 2007/0254598 A1 | 11/2007 | Bachl et al. | |
| 2008/0220766 A1 * | 9/2008 | Bertho | H04W 36/30 455/423 |
| 2009/0180451 A1 | 7/2009 | Alpert et al. | |
| 2009/0215472 A1 | 8/2009 | Hsu | |
| 2009/0279483 A1 | 11/2009 | Falchuk et al. | |
| 2009/0318183 A1 | 12/2009 | Hugl et al. | |
| 2010/0017861 A1 | 1/2010 | Krishnaswamy et al. | |
| 2010/0021648 A1 | 1/2010 | Ota | |
| 2010/0061321 A1 | 3/2010 | Calvanese Strinati et al. | |
| 2010/0113010 A1 | 5/2010 | Tenny et al. | |
| 2010/0135257 A1 * | 6/2010 | Higuchi | H04J 11/0069 370/336 |
| 2010/0216468 A1 | 8/2010 | Kazmi et al. | |
| 2010/0234042 A1 | 9/2010 | Chan et al. | |
| 2010/0279637 A1 | 11/2010 | Umatt | |
| 2010/0291925 A1 * | 11/2010 | Nagata | H04J 11/0069 455/434 |
| 2010/0317357 A1 * | 12/2010 | Miki | H04J 13/00 455/450 |
| 2011/0001567 A1 | 1/2011 | Nicholls et al. | |
| 2011/0007696 A1 | 1/2011 | Dayal et al. | |
| 2011/0007856 A1 | 1/2011 | Jang et al. | |
| 2011/0072101 A1 * | 3/2011 | Forssell | H04W 48/18 709/206 |
| 2011/0085498 A1 | 4/2011 | Oba et al. | |
| 2011/0086498 A1 | 4/2011 | Cheng et al. | |
| 2011/0096706 A1 | 4/2011 | Ramasamy et al. | |
| 2011/0143753 A1 * | 6/2011 | Rahman | H04W 48/16 455/432.1 |
| 2011/0151874 A1 | 6/2011 | Olsson et al. | |
| 2011/0151924 A1 * | 6/2011 | Miller | H04W 48/18 455/552.1 |
| 2011/0182221 A1 | 7/2011 | Arakawa | |
| 2011/0201347 A1 | 8/2011 | Abraham et al. | |
| 2011/0228750 A1 | 9/2011 | Tomici et al. | |
| 2011/0244869 A1 | 10/2011 | Olofsson et al. | |
| 2012/0034910 A1 * | 2/2012 | Fang | H04W 28/16 455/422.1 |
| 2012/0044910 A1 * | 2/2012 | Maeda | H04L 5/0005 370/332 |
| 2012/0057457 A1 * | 3/2012 | Ahmadi | H04L 12/5692 370/235 |
| 2012/0069823 A1 * | 3/2012 | Low | H04W 4/00 370/335 |
| 2012/0135737 A1 * | 5/2012 | Yoshihara | H04W 36/30 455/436 |
| 2012/0202549 A1 * | 8/2012 | Eriksson | H04W 28/16 455/513 |
| 2012/0213161 A1 * | 8/2012 | Maeda | H04L 5/0042 370/328 |
| 2012/0230303 A1 | 9/2012 | Guo et al. | |
| 2012/0231802 A1 | 9/2012 | Ngai | |
| 2012/0300686 A1 * | 11/2012 | Maeda | H04W 52/0206 370/311 |
| 2012/0307715 A1 * | 12/2012 | Maeda | H04L 5/001 370/315 |
| 2014/0056275 A1 | 2/2014 | Behnamfar et al. | |

FOREIGN PATENT DOCUMENTS

| | | |
|---|---|---|
| JP | H03174632 A | 7/1991 |
| JP | 2010050961 A | 3/2010 |
| JP | 2012527194 A | 11/2012 |
| JP | 2013502188 A | 1/2013 |
| JP | 2013509100 A | 3/2013 |
| WO | 2009090684 A1 | 7/2009 |
| WO | 2010012268 A1 | 2/2010 |
| WO | 2010121168 A1 | 10/2010 |
| WO | 2010132710 A1 | 11/2010 |
| WO | 2011020110 A1 | 2/2011 |
| WO | 2011022570 A1 | 2/2011 |
| WO | 2011046477 A1 | 4/2011 |
| WO | 2011050195 A1 | 4/2011 |
| WO | 2011056252 A1 | 5/2011 |
| WO | 2011056254 A1 | 5/2011 |

OTHER PUBLICATIONS

Japanese Patent Application No. 2015-180052—Office Action dated Aug. 29, 2016.
Chinese Patent Application No. 201210245491.7—Office Action dated Apr. 10, 2015.
Chinese Patent Application No. 201210245491.7—Office Action dated Jun. 5, 2014.
Japanese Patent Application No. 2014-511604—Office Action dated Nov. 10, 2014.
Chinese Patent Application No. 201210245521.4—Office Action dated Jun. 30, 2014.
Japanese Patent Application No. 2014-511606—Office Action dated Nov. 10, 2014.

* cited by examiner

APPARATUS AND METHODS FOR OPTIMIZING SCHEDULED OPERATIONS IN HYBRID NETWORK ENVIRONMENTS

CROSS-REFERENCE TO RELATED APPLICATIONS

This application is a continuation of U.S. application Ser. No. 13/475,655, filed May 18, 2012, entitled "APPARATUS AND METHODS FOR OPTIMIZING SCHEDULED OPERATIONS IN HYBRID NETWORK ENVIRONMENTS," which claims the benefit of U.S. Provisional Application No. 61/488,663, filed May 20, 2011, entitled "APPARATUS AND METHODS FOR OPTIMIZING SCHEDULED OPERATIONS IN HYBRID NETWORK ENVIRONMENTS," U.S. Provisional Application No. 61/598,824, filed Feb. 14, 2012, entitled "APPARATUS AND METHODS FOR OPTIMIZING SCHEDULED OPERATIONS IN HYBRID NETWORK ENVIRONMENTS," and U.S. Provisional Application No. 61/599,325, filed Feb. 15, 2012, entitled "APPARATUS AND METHODS FOR OPTIMIZING SCHEDULED OPERATIONS IN HYBRID NETWORK ENVIRONMENTS," the contents of which are incorporated herein by reference in their entirety for all purposes.

This application is related to U.S. application Ser. No. 13/475,482, filed on May 18, 2012, entitled "APPARATUS AND METHODS FOR CLIENT SERVER INTERACTION IN HYBRID NETWORK ENVIRONMENTS," U.S. application Ser. No. 13/475,802, filed on May 18, 2012, to be issued as U.S. Pat. No. 9,008,033 on Apr. 14, 2015, entitled "APPARATUS AND METHODS FOR NETWORK ASSISTED HYBRID NETWORK OPERATION," U.S. Provisional Application No. 61/478,922, filed Apr. 25, 2011, entitled "DUAL NETWORK MOBILE DEVICE RADIO RESOURCE MANAGEMENT," U.S. application Ser. No. 13/099,204, filed May 2, 2011, now U.S. Pat. No. 8,688,160, issued on Apr. 1, 2014, entitled "SINGLE-RADIO DEVICE SUPPORTING COEXISTENCE BETWEEN MULTIPLE RADIO ACCESS TECHNOLOGIES," U.S. Provisional Application No. 61/472,617, filed Apr. 6, 2011, entitled "MULTIPLE NETWORK MOBILE DEVICE CONNECTION MANAGEMENT," U.S. Provisional Application No. 61/433,160, filed Jan. 14, 2011, entitled "DYNAMIC LOADING IN DEVICES WITH MULTIPLE ANTENNAS," and U.S. Provisional Application No. 61/433,162, filed Jan. 14, 2011, entitled "MULTIMODE USER EQUIPMENT WITH DUAL CIRCUIT ARCHITECTURE," each of the foregoing being incorporated herein by reference in its entirety.

FIELD

The present invention relates generally to operation within heterogeneous wireless systems such as, for example, hybrid network operation in which client devices can communicate using any one or more of several networks. More particularly, in one exemplary aspect, the present invention is directed to methods and apparatus for intelligent scheduling of client device tasks based on network scheduling constraints.

BACKGROUND

A cellular network operator provides mobile telecommunications services to the public via a network infrastructure of e.g., cellular base stations (BS), base station controllers, infrastructure nodes, etc. There is a wide variety of cellular network technologies, and historically cellular devices have been specialized for operation within a single cellular network. However, as cellular technologies have become increasingly commoditized, devices are now able to offer so-called "multimode" operation; i.e., a single device that is capable of operation on two or more cellular networks. Multimode operation allows a device to operate on any one of several network technologies, but does not enable operation on multiple network technologies simultaneously.

Incipient research is directed to so-called "hybrid" network operation. During hybrid network operation, the client device operates simultaneously among multiple distinct networks having different technologies. In one exemplary case, a hybrid device can support both: (1) Long Term Evolution (LTE) and (ii) Code Division Multiple Access 1X (CDMA 1X) networks; i.e., the device can maintain a simultaneous connection between a first LTE network and a second CDMA 1X network. For example, a LTE/CDMA 1X hybrid device can conduct a voice call over the CDMA 1X network while the mobile device is in LTE mode. In another exemplary case, a hybrid device can support both: (i) CDMA 1X-EVDO (Evolution Data Optimized) and (ii) CDMA 1X networks.

Existing solutions for hybrid network operation rely on the client device to manage its own operation between networks. Specifically, the client device is responsible for maintaining its active connections to the various service networks; there are no required changes to existing network installations (i.e., hybrid network operation does not affect the legacy hardware and software of the network infrastructure). Client-centric hybrid operation has several benefits. For example, there is very little (if any) infrastructure cost for the network operator. Moreover, hardware costs can be incorporated into the price of consumer devices. Additionally, hybrid network operation will not affect existing legacy devices. Similarly, devices capable of hybrid operation are also capable of normal operation.

However, since existing solutions for hybrid network operation do not require the constituent networks to coordinate with one another, the client device will inevitably experience certain scheduling collisions. For example, while a mobile device is attached to a first LTE network, it must periodically "tune out" the LTE network to perform CDMA 1X actions (such as decoding the Quick Paging Channel (QPCH) to determine if the device is being paged). If the mobile device is receiving data from the LTE network during the tune out period, this data is lost. Furthermore, a tuned out mobile device will miss any broadcasted updated network resource information or control data, this can result in the mobile device being barred from access to the LTE network (at least for a period of time).

Consequently, improved methods and apparatus are needed for intelligent scheduling of client device tasks based on network scheduling constraints.

SUMMARY

The present invention satisfies the aforementioned needs by providing, inter alia, improved apparatus and methods for intelligent scheduling of client device tasks based on network scheduling constraints.

In one aspect of the present invention, a client apparatus configured to intelligently schedule network tasks based on multiple network schedule constraints is disclosed. In one exemplary embodiment, the client apparatus includes one or more wireless interfaces, a processor; and a non-transitory computer-readable medium including at least one computer program. In one variant, the at least one computer program is configured to, when executed by the processor, classify one or more tasks associated with a first network according to a corresponding time sensitivity requirements, determine a schedule of flexible tasks for the first network based at least in part on one or more tasks associated with a second network where the determined schedule orders the one or more tasks associated with the first network and the one or more tasks associated with the second network based on the one or more time sensitivity requirements, and execute the determined schedule.

In another variant, the corresponding time sensitivity requirements include at least time sensitive tasks and time insensitive tasks. In certain other variants, the at least one computer program is additionally configured to classify one or more tasks associated with the second network according to one or more second corresponding time sensitivity requirements. In yet other variants, the second network is a data-only network and the one or more tasks associated with the second network are substantially time insensitive.

In one exemplary implementation, the one or more wireless interfaces include at least a Long Term Evolution (LTE) interface and a CDMA 1X interface.

In a second aspect of the present invention, a method for intelligent scheduling of client device tasks based on multiple network scheduling constraints is disclosed. In one embodiment, the method includes classifying one or more tasks of a first network according to a corresponding time sensitivity, determining a schedule of flexible tasks for the first network based at least in part on one or more tasks of a second network, and executing the determined schedule.

In one variant, the corresponding time sensitivity requirements include at least time sensitive types and time insensitive tasks. In other variants, the corresponding time sensitivity requirements include one or more thresholds of time sensitivity, or Quality of Service (QoS) requirements.

In another variant, the method additionally includes receiving one or more information regarding one or more tasks of a second network.

In one exemplary implementation, the corresponding time sensitivity requirements are based on one or more periodic events. For example, the one or more periodic events include paging channel operation. In one such sub-variant, the second network is a data-only network and the one or more tasks of the second network are time insensitive.

In another implementation, the first network is a CDMA 1X compliant network, and the second network is a Long Term Evolution (LTE) compliant network.

In a third aspect of the present invention, a client apparatus configured to intelligently schedule network tasks for hybrid network operation is disclosed. In one embodiment, the client apparatus includes one or more wireless interfaces, a processor, and a non-transitory computer-readable medium including at least one computer program, the at least one computer program configured to, when executed by the processor: classify one or more data-only tasks associated with a first network; classify one or more prioritized tasks associated with a second network; and interleave the one or more data-only tasks with the one or more prioritized tasks.

In one variant, the prioritized tasks are classified according to time sensitivity, and/or Quality of Service (QoS) requirements.

In another variant, the one or more prioritized tasks includes one or more paging channel operations of the second network. In a similar variant, the one or more prioritized tasks includes one or more radio measurements of the second network.

In one embodiment, the first network is a Long Term Evolution (LTE) compliant network.

In fourth aspect of the present invention, a method for intelligent scheduling of client device tasks based on one or more network scheduling constraints is disclosed. In one embodiment, the method includes: classifying one or more tasks of a first network according to a corresponding time sensitivity; determining a schedule of flexible tasks for the first network based at least in part on one or more tasks of a second network; and executing the determined schedule.

In a fifth aspect of the invention, an apparatus for intelligent scheduling of client device tasks based on one or more network scheduling constraints is disclosed. In a first embodiment, the networks are substantially unsychronized, and the apparatus includes a scheduling engine configured to schedule one or more network resources according to task time sensitivity.

In a sixth aspect of the invention, a computer-readable storage apparatus is disclosed. In one embodiment, the apparatus includes a storage medium having at least one computer program stored thereon, the at least one program being configured to, when executed, (i) classify one or more tasks of a first network according to a corresponding time sensitivity, (ii) determine a schedule of flexible tasks for the first network based at least in part on one or more tasks of a second network, and/or (iii) execute the determined schedule.

In a seventh aspect of the invention, a hybrid network system is disclosed. In one embodiment, the system includes at least two networks, and a client device of the hybrid network system that schedules one or more of its tasks based on schedule requirements of the at least two networks.

In an eighth aspect of the invention, a client device capable of hybrid network operation and task scheduling is disclosed.

Other features and advantages of the present invention will immediately be recognized by persons of ordinary skill in the art with reference to the attached drawings and detailed description of exemplary embodiments as given below.

DETAILED DESCRIPTION

Reference is now made to the drawings, wherein like numerals refer to like parts throughout.

Overview

Various aspects of the present invention provide, inter alia, a method for a client device to properly prioritize and re-schedule tasks in a hybrid network. In one exemplary embodiment, a UE operating in CDMA 1X and LTE networks schedules various time-sensitive and non-time sensitive tasks of the CDMA 1X network so as to minimally affect LTE network operation.

For example, as described in greater detail hereinafter, a hybrid mode UE prioritizes CDMA 1X maintenance tasks as P1 (time sensitive), P2 (time insensitive), P3 (time insensitive, uninterruptible). The exemplary UE schedules LTE tasks around P1 CDMA 1X tasks, but P2 and P3 CDMA 1X tasks are flexibly advanced or delayed so as to minimally affect LTE operation.

Various other embodiments of the present invention are described in greater detail hereinafter.

Detailed Description Of Exemplary Embodiments

Exemplary embodiments and aspects of the present invention are now described in detail. While these embodiments and aspects are primarily discussed in the context of Long Term Evolution (LTE), Code Division Multiple Access 1X (CDMA 1X) cellular networks, and CDMA 1X EVDO (Evolution Data Optimized), it will be recognized by those of ordinary skill that the present invention is not so limited and can be used with other cellular technologies such as TD-LTE (Time-Division Long-Term. Evolution), TD-LTE-Advanced, TD-SCDMA (Time Division Synchronous Code Division Multiple Access)) and Global System for Mobile Communications (GSM). In fact, the various aspects of the invention are useful in combination with any network (cellular, wireless, wireline, or otherwise) that can benefit from intelligent scheduling of client device tasks based on network scheduling constraints.

Moreover, it will be appreciated that while exemplary embodiments of the apparatus and methods of the invention are described in terms of scheduling e.g., time-sensitive and non-time sensitive tasks of one network (e.g., CDMA 1X) so as to mitigate or eliminate the effects on another network (e.g., LTE): (i) these roles may be reversed (e.g., some LTE network tasks could be rescheduled so as to minimize impact on the CDMA 1X network); and (ii) a cooperative approach may be implemented (e.g., where both networks schedule tasks so as to minimize impact on both networks).

LTE/CDMA 1X Hybrid Network Operation

Figure 1:
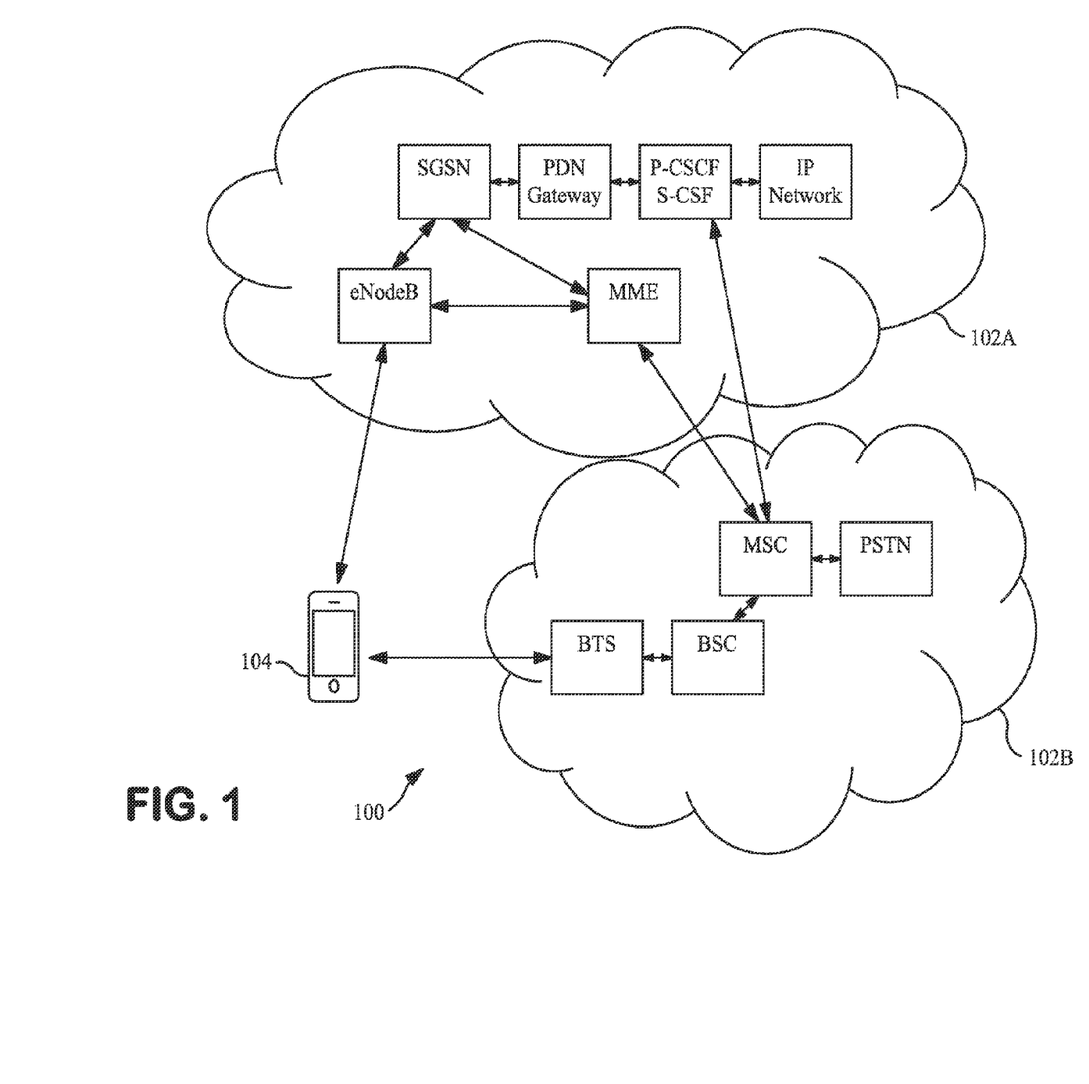
FIG. 1 is a logical block diagram illustrating one exemplary hybrid network system useful in conjunction with the present invention.

FIG. 1 illustrates an exemplary hybrid network system 100. The exemplary hybrid network includes a first LTE RAN (radio access network) 102A and a second CDMA 1X RAN 102B in communication with a user equipment (UE) client device 104. As shown in FIG. 1, the LTE RAN and CDMA 1X RAN are unsynchronized, and entirely unaware of the other RAN's operation. In other scenarios, the RANs may have higher levels of coordination; e.g., the RANs may be loosely synchronized, or even tightly synchronized in certain aspects of their operation. During LTE/CDMA 1X hybrid mode operation, the UE 104 can place CDMA 1X voice calls while registered with the LTE network. The UE is capable of receiving and responding to data and control messaging from either the LTE network or the CDMA 1X network; unfortunately, the UE in this scenario cannot respond simultaneously to both networks. In one such embodiment, the UE always prioritizes CDMA 1X (voice call) traffic over LTE (data) traffic to ensure that user experience for voice calls is unaffected. Other implementations may have other prioritization schemes (e.g., where voice calls are lower priority, based on the type of traffic, historic device usage, etc.).

Within this context, many operations can be greatly affected by the UE switching. For example, as described in U.S. Provisional Application No. 61/488,649, filed on May 20, 2011, entitled "APPARATUS AND METHODS FOR CLIENT SERVER INTERACTION IN HYBRID NETWORK ENVIRONMENTS," incorporated herein by reference in its entirety, maintenance tasks that are interrupted can introduce data corruptions and/or errors which can contribute to highly undesirable behavior (e.g., networks being barred, devices being improperly managed, etc.). While the foregoing disclosure provides methods and apparatus for modifying network management for hybrid operation, further improvements to client device operation so as to alleviate scheduling conflicts would be useful.

In particular, once the UE 104 has connected to the LTE network 102A, the UE will periodically tune its radio away from the LTE network to perform CDMA 1X maintenance actions such as acquiring a CDMA 1X cell, registering to the acquired CDMA 1X cell, and receiving CDMA 1X pages, etc. Depending on CDMA 1X network 102B radio conditions, these actions can range in one exemplary implementation from eighty milliseconds (80 ms) up to several seconds (4 s-6 s). Moreover, when the UE receives or places a voice call on the CDMA 1x network, the LTE connection may be dropped.

Various embodiments of the present invention prioritize and schedule flexible network maintenance tasks of a first network to improve operation of a second network. For example, CDMA 1X has certain tasks which can be flexibly managed to improve LTE operation. Accordingly, the client device can increase hybrid network performance by ensuring that various CDMA 1X tasks are advanced or delayed with respect to LTE network operation.

TD-LTE/TD-SCDMA Network Operation

As is understood in the art, Time-Division Long-Term Evolution (TD-LTE) also known as Long-Term Evolution Time-Division Duplex (LTE TDD) is similar to Frequency Division (FD)-LTE. In the case of Frequency Division Duplex, the downlink and uplink are transmitted using different frequencies. In Time Division Duplex, the downlink and the uplink are on the same frequency and the separation occurs in the time domain, so that each direction in a call is assigned to specific timeslots. Similarly, Time Division Synchronous Code Division Multiple Access (TD-SCDMA) allows traffic to be uplinked (from the mobile terminal to the base station) and downlinked (from the base station to the mobile terminal) using different time slots in the same frame. Embodiments of the present invention contemplate the use of these technologies together and/or separately (in combination with other technologies) in a hybrid network, such as by implementing the methodology described herein with respect to FIG. 2 (except using one or more different combinations of radio access technologies set forth herein).

In an exemplary embodiment relating to both TD-LTE and TD-SCDMA, a UE connected to the TD-LTE network will periodically (or on an event driven or other basis) tune its radio away from the TD-LTE network to perform TD-SCDMA actions such as cell selection, registration, and receiving pages.

TD-LTE/GSM Network Operation

As is understood in the art, Global System for Mobile Communications (GSM) is a cellular technology standard and has evolved a number of advancements including General Packet Radio Service (GPRS), Enhanced Data rates for GSM Evolution (EDGE), and Universal Mobile Telecommunications System (UMTS) also known as 3G (Third Generation) UMTS.

In an exemplary embodiment relating to both TD-LTE and GSM, a UE connected to the TD-LTE network will periodically (or on an event driven or other basis) tune its radio away from the TD-LTE network to perform GSM actions such as cell selection, registration, and receiving pages.

Methods

Figure 2:
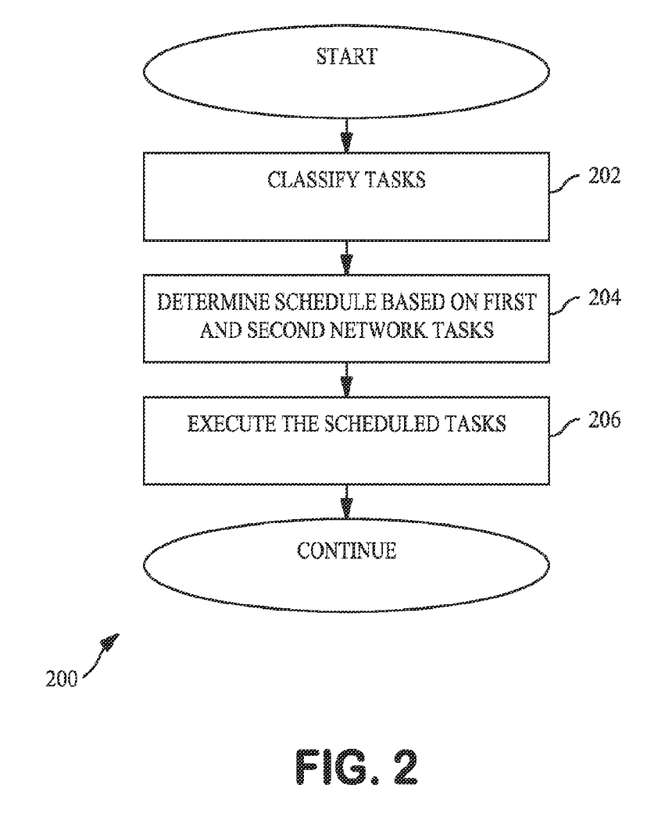
FIG. 2 is a logical flow diagram detailing one embodiment of a generalized method for intelligent scheduling of client device tasks based on multiple network scheduling constraints, in accordance with the present invention.

Referring now to FIG. 2, one embodiment of a generalized method 200 for intelligent scheduling of client device tasks based on multiple network scheduling constraints is illustrated. In one scenario, a client device is connected to a first network, and the first network is entirely unaware of the client device's connections to other networks. Alternatively, the first network may have limited information on nearby networks (e.g., timing information, registered devices, etc.) which may be periodically refreshed, but is not integrated within the operational decisions for the first network. Still other network scenarios may tightly integrate the first network and the other networks, but still require intelligent management of conflicting schedules to minimize collisions (e.g., where the networks share information such as location area updates, paging information, etc.). For example, even where a first LTE network is tightly coupled to a second CDMA 1X network, the LTE network must intelligently schedule its device accesses around the CDMA 1X network schedule, and vice versa.

At step 202 of the method 200, the client device classifies one or more tasks of a first network according to time sensitivity. In one exemplary embodiment, the one or more tasks are minimally divided into a "time sensitive", and a "non-time sensitive" category, although it will be appreciated that other types and/or numbers of categories (and in fact categorization schemes) may be used consistent with the invention as described subsequently herein. As used herein, the terms "time sensitivity", "time sensitive", "time insensitive", "non-time sensitive", etc. are used to broadly describe without limitation any number of different tasks, operations, or requirements associated with the operation of the device within the network, or with the network itself which have some temporal component or requirement (or lack thereof). The time sensitivity may be based on, e.g., tasks or operations: (i) necessary to keep the client device or UE in communication with the network, (ii) necessary to support temporally sensitive or periodic operations (e.g., to meet timing or QoS requirements for streaming media, emergency calls, important update broadcasts or beacons, etc.), and/or (iii) to support user-specified preferences or requirements (e.g., maximize response time, etc.).

Additionally, while a "time sensitive" (i.e., two-state) hierarchy of tasks is described with respect to the exemplary embodiments, it will be appreciated that any number of other schemes may be employed, such as a linear scale of sensitivity (e.g., 1-10) with one or more thresholds for varying types of actions, an "always/never" scheme (e.g., where some actions or tasks are always time sensitive, and others are never time sensitive), etc. Moreover, temporal sensitivity is but one metric or characteristic which can be used as the basis of categorization; others might include e.g., "QoS necessary" or "non-QoS", etc.

Time sensitivity may be further modified or classified according to a type of time sensitivity. Common examples of additional time requirements include without limitation: (i) a fixed time (e.g., slot, interval, duration, etc.), (ii) a required before time, (iii) a required after time, (iv) a required within time, (v) a maximum duration, (vi) a minimum duration, etc. Furthermore, in some embodiments, time sensitivity may be further annotated with useful metadata such as e.g., (i) expected execution time, (ii) typical execution duration, etc.

In one exemplary embodiment, the one or more tasks are additionally categorized based on one or more other modifiers. Common examples of other categories include without limitation: (i) priority, (ii) interruptable, (iii) associated network, (iv) number of failed attempts, etc.

For example, in one implementation of the invention, a user equipment (UE) classifies several CDMA 1X tasks. In this example, monitoring the CDMA 1X quick paging channel (QPCH) is a high priority task which must be performed according to a strict time schedule. Other idle mode procedures (e.g., cell selection, cell re-selection, overhead message decoding, etc.) are lower priority tasks, and may be performed flexibly within a broader temporal window; e.g., several hundred milliseconds to several seconds may be acceptable in certain cases.

Furthermore, mobility management and other Non-Access Stratum (NAS) procedures are triggered when the UE passes a reception boundary, and new registration is needed. Once a NAS procedure is initiated, the CDMA 1X network must finish (i.e., is not interruptable).

Moreover, while the aforementioned tasks are largely network maintenance tasks, it is recognized that various aspects of the present invention can be adapted for other types of tasks including, but not limited to: media processing tasks, data transfer tasks, user interface tasks, etc.

In fact, ones of ordinary skill in the art could, given the present disclosure, readily adapt multiple aspects of the present invention to any scheme wherein multiple independent streams of data having various time requirements must be handled among limited resources.

In some implementations, the various classifications of tasks are limited to a first network. For example, in one exemplary embodiment of the invention, only tasks of the CDMA 1X network are classified. As described in greater detail hereinafter, other tasks are considered secondary to proper operation of the CDMA 1X network, within reason. However, in alternate implementations, two or more networks (e.g., a first and second network) may each be evaluated for appropriate classifications of tasks. For example, future implementations of hybrid network operation may include separate classifications for the CDMA 1X network tasks and LTE network tasks.

At step 204 of the method 200, the client device determines a schedule of flexible tasks for the relevant network(s) (in this example, the first network) based at least in part on one or more tasks of one or more second networks.

For example, in one embodiment, the client device schedules the one or more time-sensitive tasks for the first network, then schedules one or more tasks of the second network, and in the remaining available resources, schedules the remaining time-insensitive tasks of the first network. In one such scenario, a hybrid UE connected to a LTE network and a CDMA 1X network generates a schedule by allocating appropriate time slots according to the following order: (1) time sensitive CDMA 1X network tasks, (2) LTE network tasks, (3) time insensitive CDMA 1X tasks, and so forth.

As previously noted, it is appreciated that various alternate embodiments of the present invention may further enable finer gradation than merely time-sensitive and time-insensitive tasks. For example, in some network scenarios, various gradations of priority may be used to enable further fine-tuning; e.g., time-prioritized tasks above a prescribed threshold priority may be prioritized first, followed by tasks of a second network, followed by the remaining tasks for the first network.

Moreover, it is further recognized that where first and second network tasks are classified, various schemes may be used to interleave the various tasks. For example, such embodiments may schedule tasks according to the following: (1) time prioritized tasks above a first threshold value for the first network, (2) time prioritized tasks above a first threshold value for the second network, (3) time insensitive tasks of the first and second network, and so forth.

Yet other combinations and schemes for scheduling may be modified for use with the various embodiments of the present invention by those of ordinary skill, given the contents of the present disclosure.

At step 206 of the method 200, the client device executes the one or more tasks according to the determined schedule.

It is also appreciated that while the methodology of FIG. 2 is described generally in terms of a sequence of steps, the order may be permuted, and in some cases conducted in parallel. For instance, the present invention contemplates use of two or more "scheduling threads", whereby certain individual time-sensitive tasks are scheduled at a given time, and others at a later time. This "rolling" approach allows flexibility from the standpoint that all scheduling for all tasks need not be completed before execution of any of those tasks. Rather, under the rolling model, execution of one task may be performed as soon as its scheduling is completed, without regard to the completion of scheduling of other tasks.

Example Operation

Figure 3:
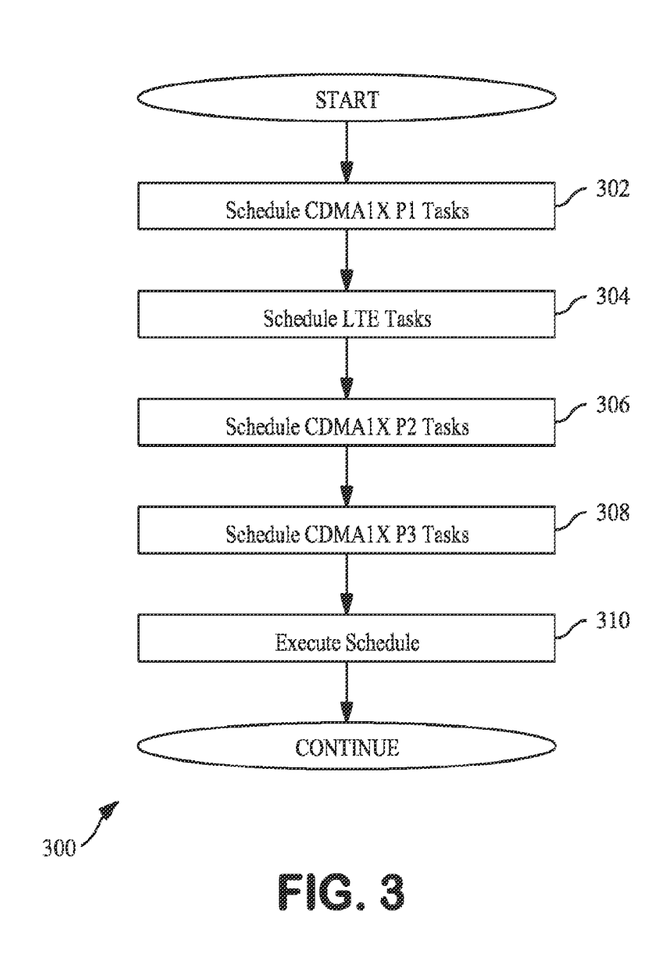
FIG. 3 is a logical flow diagram detailing one exemplary implementation of the method of FIG. 2 in the context of a Long Term Evolution network and a Code Division Multiple Access 1X network.

Referring now to FIG. 3, one exemplary implementation of the method 300 of FIG. 3 is shown and described, specifically in the context of intelligent scheduling of client device tasks based on multiple network scheduling constraints of a Long Term Evolution (LTE) network and Code Division Multiple Access 1X (CDMA 1X) network. In one embodiment of the present invention, a LTE/CDMA 1X hybrid user equipment (UE) device executes a number of operations during discontinuous reception (DRX) operation.

As a brief aside, DRX is a commonly implemented method for reducing power consumption within cellular devices. During DRX operation, the UE and CDMA 1X network agree on specific time intervals where data transfer can be initiated; the UE only needs to power on at these specific time intervals. Thus, when the device does not have an active data transfer, and is between time intervals, the device can turn its receiver off and "sleep" in a low power state.

Each time the UE device "wakes up" from a DRX sleep cycle, it must perform the following operations: (i) time sensitive paging monitoring (P1), (ii) less time critical idle mode procedures (P2), and (iii) time insensitive, but non-interruptable Non-Access Stratum (NAS) procedures (P3).

Specifically, P1 type tasks must obey strict timing requirements (e.g., decode the QPCH according to a slot assignment, etc.). P2 type tasks include idle mode procedures which are less time critical, and can be delayed or re-scheduled by several hundred milliseconds (up to several seconds). Common examples of P2 type tasks include without limitation: (i) cell selection/re-selection, (ii) overhead message decoding, etc. P3 type tasks are not time critical, but once the task is initiated, the task must be completed. P3 tasks include mobility management, etc. (e.g., when the UE moves across service boundaries, when new registration is needed, etc.). Unlike other tasks, P3 tasks cannot be interrupted and must be allowed to finish, once started.

Referring back to FIG. 3, during LTE/CDMA 1X hybrid mode operation, to minimize the impact to LTE operation in idle or RRC connected state, the UE device optimizes the CDMA 1X timeline arrangement according to the priority and latency tolerance of above tasks. For example, P1 type transactions are non-negotiable, and must be honored exactly per slot assignments, etc. However, P1 type transactions generally do not take very long. For example, as soon as paging channel (PCH)/quick paging channel (QPCH) decoding is completed, the UE can return to LTE operation. Accordingly, at step 302 of the method 300, the UE schedules P1 transactions.

Thereafter, the UE schedules P2 type transactions to avoid collisions with LTE activities. Thus, one or more LTE activities are scheduled at step 304, and the remaining time slots are scheduled for P2 type transactions at step 306. Furthermore, it is readily appreciated that P2 transactions can be further grouped, or split into multiple elementary procedures. While switching back and forth between the CDMA 1X network and LTE network is substantially less efficient, these smaller elementary processes are easier to manage, as each process takes less time to finish. Conceivably, many of these smaller elementary processes can be easily and intelligently scheduled into gaps in LTE operation.

Lastly, P3 tasks are scheduled at step 308. P3 tasks are time flexible, but once started must be finished.

It should be further realized that in some cases, each of the foregoing tasks may be further interrelated. For example, while NAS procedures are time insensitive in and of themselves, current NAS data is helpful to reduce other tasks, such as cell selection/cell re-selection. Consequently, while certain P3 tasks may be postponed, may prioritize such tasks higher after a number of postponements. Still other methods for ensuring that certain tasks are appropriately prioritized include for example: increasing priority weights, counter values, etc.

Finally, at step 310 of the method, the UE executes the scheduled tasks.

Apparatus

Figure 4:
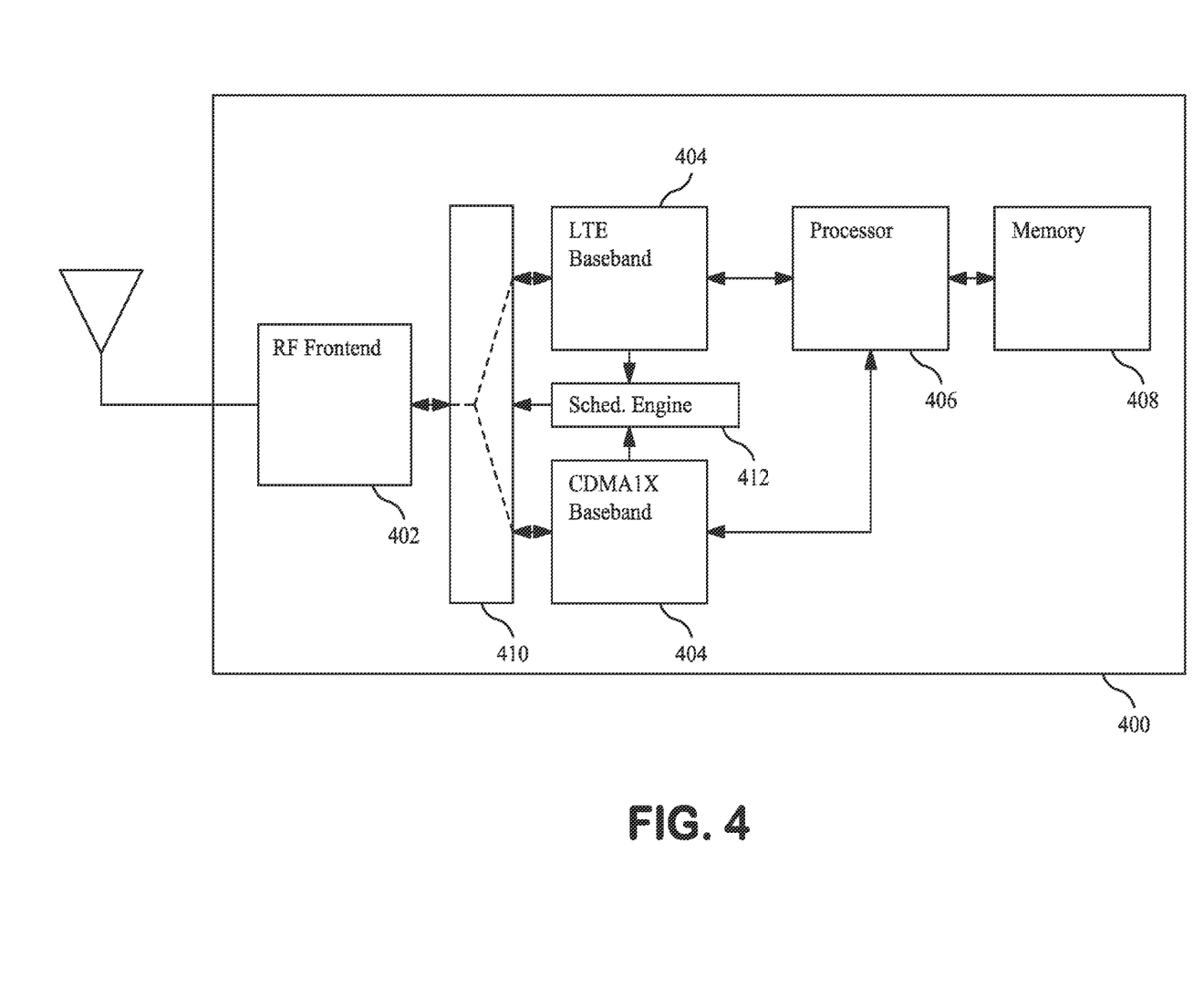
FIG. 4 is a functional block diagram of an exemplary embodiment of a user equipment (UE) apparatus configured according to the present invention

Referring now to FIG. 4, the exemplary user equipment (UE) apparatus 400 is illustrated in greater detail. The UE includes: (i) one or more Radio Frequency (RF) front-ends 402, (ii) one or more baseband processors 404, and (iii) at least one application processor 406 and associated memor(ies) 408. In various implementations, the RF front-ends and baseband processors may be further specialized to handle a single wireless technology, or generalized to encompass multiple wireless technologies.

As shown, the exemplary UE includes a first RF front-end that is coupled to both first and second baseband processors adapted to interface to a LTE network and CDMA 1X network, respectively. It is further appreciated that the foregoing configuration is purely illustrative, and various implementations may include other cellular technologies such as GSM, GPRS, EDGE, WCDMA, CDMA2000, CDMA 1X EVDO, LTE-A (LTE Advanced), etc. in various combinations. Moreover, while only a single RF front-end is shown for simplicity, it is appreciated that a RF front-end can (and generally will) include multiple receive and/or transmit antennas and/or chains. For example, well known MIMO (Multiple In Multiple Out), SISO (Single in Single Out), MISO (Multiple In Single Out), and SIMO (Single In Multiple Out) antenna configurations are widely used within the related arts, and may be used consistent with the present invention.

Additionally, in one exemplary embodiment of the present invention, the UE 400 further includes a switching fabric 410 that can connect any one (or more) of the baseband processors 404 to various one (or more) of the antennas 402. The illustrated switching fabric is adapted to connect either the LTE baseband or CDMA 1X baseband to the RF front-end. However, common embodiments may connect one baseband processor to one antenna ("one-to-one"), one-to-many, many-to-one, etc. This "switching" capability is desirable for a number of reasons, including for example: (i) power management, (ii) processing efficiency/flexibility, and (iii) antenna isolation constraints may require that only a subset of radios of a mobile device are active at any one time. In some small form factor designs, there is not enough space to completely isolate multiple antennas during operation; consequently, only one antenna can be active at any time. Similarly, certain form factor designs may reuse antennas for different wireless interfaces, such that only one wireless interface can use a common antenna at any given time. Yet other motivations will be appreciated by those of ordinary skill in the related arts, and are not discussed further herein (e.g., business or profit considerations, network utilization, etc.)

Moreover, it will be appreciated that other components are commonly incorporated within UE 400, but are not discussed further herein. For example, the UE may include user interface components (display screens, buttons, touch screens, dials, etc.), memory components (e.g., RAM (Random Access Memory), Flash, hard disk drives (HDD), etc.), power management components (e.g., batteries, charger components, etc.), and external interfaces (e.g., FireWire™, Universal Serial Bus™ (USB), Thunderbolt, etc.)

Furthermore, it should be recognized that the UE depicted in FIG. 4 is merely illustrative of one exemplary embodiment. Still other variants useful with the present invention are described with greater detail in U.S. Provisional Application No. 61/478,922, filed Apr. 25, 2011, entitled "DUAL NETWORK MOBILE DEVICE RADIO RESOURCE MANAGEMENT," U.S. application Ser. No. 13/099,204, filed May 2, 2011, now U.S. Pat. No. 8,688,160, issued on Apr. 1, 2014, entitled "SINGLE-RADIO DEVICE SUPPORTING COEXISTENCE BETWEEN MULTIPLE RADIO ACCESS TECHNOLOGIES," U.S. Provisional Application No. 61/472,617, filed Apr. 6, 2011, entitled "MULTIPLE NETWORK MOBILE DEVICE CONNECTION MANAGEMENT," U.S. Provisional Application No. 61/433,160, filed Jan. 14, 2011, entitled "DYNAMIC LOADING IN DEVICES WITH MULTIPLE ANTENNAS," and U.S. Provisional Application No. 61/433,162, filed Jan. 14, 2011, entitled "MULTIMODE USER EQUIPMENT WITH DUAL CIRCUIT ARCHITECTURE," each of the foregoing being incorporated herein by reference in its entirety.

The baseband processors 404 are connected to a scheduling engine 412, where the scheduling engine is configured to schedule one or more network resources according to task time sensitivity. In one exemplary embodiment, the scheduling engine includes a computer program which obtains one or more tasks from the baseband processors, and schedules the tasks in accordance with the various time sensitivities for the one or more other networks. Other approaches may be used as well, such as combinations of software and logic, etc.

In one variant, the schedule information may be based on known operation of the one or more other networks, or alternately, may be identified to the scheduling engine 412 via explicit messaging. For example, a peer network entity of one or more other networks may provide the scheduling engine with e.g., a known paging schedule. In other variants, the schedule information may be known a priori by the scheduling engine. For example, the scheduling engine may have been manufactured with scheduling information associated with the one or more other networks, or be updated with such information by e.g., a manufacturing authority, or other supervisory entity. Such updates may be received through the wireless interface(s), or via other interfaces (including e.g., wireline). In yet another variant, the engine 412 is "intelligent" such that it can divine or extrapolate schedules or patterns based on its observation of one or more operational parameters over time. For instance, if the UE (and its engine 412) detect a given event occurring at a regular prescribed interval, it can extrapolate a schedule from these observations, even without any a priori or other knowledge of the schedule.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A client apparatus for scheduling network tasks based on multiple network schedule constraints, the client apparatus comprising:
    one or more wireless interfaces configured to communicate with a first network and a second network;
    one or more processors;
    a scheduling engine, wherein the scheduling engine includes scheduling logic that is configured to schedule one or more network resources according to one or more time sensitivity requirements; and
    a non-transitory computer-readable medium storing instructions that, when executed by the one or more processors, cause the client apparatus to:
        classify one or more tasks associated with the first network and one or more tasks associated with the second network according to the one or more time sensitivity requirements, wherein the one or more time sensitivity requirements comprise time sensitivity thresholds for (i) time-sensitive paging monitoring (P1 tasks), (ii) idle mode procedures (P2 tasks) that are less time critical than P1 tasks, and (iii) time-insensitive, non-interruptible procedures (P3 tasks);
        determine a schedule of tasks that orders the one or more tasks associated with the first network and the one or more tasks associated with the second network based on the one or more time sensitivity requirements; and
execute the determined schedule of tasks, the executing involving interleaving the one or more tasks associated with the first network that include communication with the first network via the one or more wireless interfaces, and the one or more tasks associated with the second network that include communication with the second network via the one or more wireless interfaces.

2. The client apparatus of claim 1, wherein the P1 tasks include decoding a paging channel (PCH) or a quick paging channel (QPCH).

3. The client apparatus of claim 1, wherein the P2 tasks include one or more of: cell selection, cell reselection, or overhead message decoding.

4. The client apparatus of claim 1, wherein the P3 tasks include a mobility management function.

5. The client apparatus of claim 1, wherein the one or more wireless interfaces comprise at least a Long Term Evolution (LTE) wireless interface and a code division multiple access (CDMA) 1X wireless interface.

6. The client apparatus of claim 5, wherein the first network comprises a CDMA 1X compliant network, the second network comprises an LTE compliant network, and an order of the schedule of tasks determined by the client apparatus comprises CDMA 1X P1 tasks followed by LTE tasks.

7. The client apparatus of claim 1, wherein classification of the one or more tasks is further based on a number of failed attempts to execute the one or more tasks.

8. The client apparatus of claim 1, wherein classification of the one or more tasks is further based on sensitivity to a quality of service for the one or more tasks.

9. The client apparatus of claim 1, wherein classification of the one or more tasks is further based on an expected execution time and/or a typical execution time for the one or more tasks.

10. A method for scheduling client device tasks based on multiple network scheduling constraints, the method comprising:
by a client device:
classifying one or more tasks associated with a first network and one or more tasks associated with a second network according to one or more time sensitivity requirements, wherein the one or more time sensitivity requirements comprise one or more time sensitivity thresholds for: (i) time-sensitive paging monitoring (P1 tasks), (ii) idle mode procedures (P2 tasks) that are less time critical than P1 tasks, and (iii) time-insensitive, non-interruptible procedures (P3 tasks);
determining a schedule of tasks that orders the one or more tasks associated with the first network and the one or more tasks associated with the second network based on the one or more time sensitivity requirements; and
executing the determined schedule of tasks, the executing involving interleaving the one or more tasks associated with the first network that include communication with the first network via one or more wireless interfaces, and the one or more tasks associated with the second network that include communication with the second network via the one or more wireless interfaces;
wherein the client device comprises:
the one or more wireless interfaces that communicate with the first network and the second network,
one or more processors, and
a scheduling engine, wherein the scheduling engine includes scheduling logic that schedules one or more network resources according to the one or more time sensitivity requirements.

11. The method of claim 10, wherein the P1 tasks include decoding a paging channel (PCH) or a quick paging channel (QPCH).

12. The method of claim 10, wherein the P2 tasks include one or more of: cell selection, cell reselection, or overhead message decoding.

13. The method of claim 10, wherein the P3 tasks include mobility management functions.

14. The method of claim 10, wherein the first network comprises a code division multiple access (CDMA) 1X compliant network, and the second network comprises a Long Term Evolution (LTE) compliant network.

15. The method of claim 14, wherein an order of the schedule of tasks determined by the client device comprises CDMA 1X P1 tasks, followed by LTE tasks, followed by CDMA 1X P2 tasks, and then followed by CDMA 1X P3 tasks.

16. The method of claim 10, wherein classification of the one or more tasks is further based on a number of failed attempts to execute the one or more tasks.

17. The method of claim 10, wherein classification of the one or more tasks is further based on a sensitivity to a quality of service for the one or more tasks.

18. A method for scheduling client device tasks based on multiple network scheduling constraints, the method comprising:
at a client device:
classifying one or more tasks associated with a first code division multiple access (CDMA) 1X compliant network, and one or more tasks associated with a second LTE compliant network according to one or more time sensitivity requirements,
determining a schedule of tasks for the first CDMA 1X compliant network by allocating time slots according to an order of the schedule of tasks that prioritizes (i) time-sensitive CDMA 1X network tasks followed by (ii) Long Term Evolution (LTE) network tasks, and
executing the determined schedule of tasks, the executing involving interleaving the one or more tasks associated with the first CDMA 1X compliant network that include communication with the first CDMA 1X compliant network via one or more wireless interfaces, and the one or more tasks associated with the second LTE compliant network that include communication with the second LTE compliant network via the one or more wireless interfaces,
wherein the client device comprises:
the one or more wireless interfaces that communicate with the first CDMA 1X compliant network and the LTE network,
one or more processors, and
a scheduling engine, wherein the scheduling engine includes scheduling logic that schedules one or more network resources according to the one or more time sensitivity requirements.

19. The method of claim 18, wherein the time-sensitive CDMA 1X network tasks comprise time-sensitive paging monitoring (P1 tasks).

20. The method of claim 18, wherein the order of the schedule of tasks further prioritizes time-insensitive CDMA 1X network tasks after the LTE network tasks, wherein time-insensitive CDMA 1X tasks comprise idle mode procedures (P2 tasks) and/or time-insensitive, non-interruptible procedures (P3 tasks).

\* \* \* \* \*